(No Model.)
H. W. RAPPLEYE.
APPARATUS FOR CONDENSING FUMES FROM SMELTING FURNACES.
No. 557,880. Patented Apr. 7, 1896.
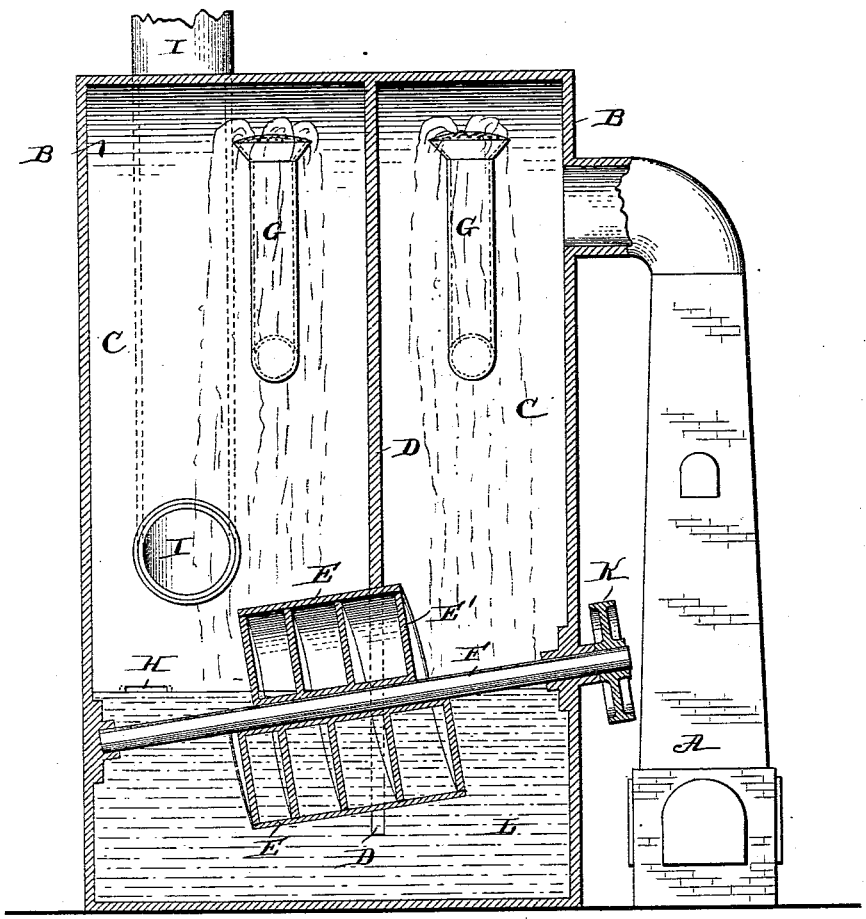
Witnesses.
Jesse B. Heller
Ira S. Heller
Inventor.
Hannibal W. Rappleye
Attorney.

UNITED STATES PATENT OFFICE.

HANNIBAL W. RAPPLEYE, OF PHILADELPHIA, PENNSYLVANIA.

APPARATUS FOR CONDENSING FUMES FROM SMELTING-FURNACES.

SPECIFICATION forming part of Letters Patent No. 557,880, dated April 7, 1896.

Application filed January 2, 1896. Serial No. 574,068. (No model.)

*To all whom it may concern:*

Be it known that I, HANNIBAL W. RAPPLEYE, a citizen of the United States, residing at Philadelphia, county of Philadelphia, and State of Pennsylvania, have invented a new and useful Improvement in Apparatus for Condensing Fumes from Smelting-Furnaces, of which the following is a full, clear, and exact description, reference being had to the accompanying drawing, which forms a part of this specification.

My invention has for its object certain improvements upon an apparatus substantially like that described and illustrated in Letters Patent No. 153,173, dated July 21, 1874. In that patent there is described and illustrated an apparatus for condensing fumes from a smelting-furnace, consisting, essentially, of a chamber divided by a partition. Below the chamber so divided is a water-compartment, in which there is a conveyer partially submerged. This conveyer is revolved by means of a shaft and connects the two parts of the chamber divided by the partition-wall. In the patent before mentioned this conveyer consists of an Archimedean screw having an area of equal extent above and below the water-line. The revolution of this screw draws in the gas or fumes from one division of the chamber and forces them into the other division of the chamber.

Certain difficulties arise in the use of this device, especially as relates to the screw conveyer, for the reason that having equal area above the water—that is to say, having the same extent of effective gas capacity throughout the conveyer at the exit end and at the inlet end—the gas enters the inlet end at a very high temperature, and therefore will fill a larger space than when it becomes reduced in temperature passing to the exit end. If, as in the patent heretofore spoken of, there be equal area of space for the gas from the inlet to the exit end, the gas only partially fills the conveyer above the water-line as it approaches the exit end, and therefore there is unequal pressure in the two parts of the chamber, and hence unequal water-level. This largely detracted from the effectiveness of the apparatus and its capacity to continuously and effectively operate.

My invention, as stated, relates specifically to the arrangement of the conveyer between the two parts of the condensing-chamber, and it relates to certain constructions whereby at all parts of the conveyer the water-line is kept constant and the space above the normal water-line filled with gas. Speaking generally, this is accomplished by making the gas portion of the conveyer of decreasing area from the inlet to the exit.

I will now describe the embodiment of my invention as illustrated in the drawing, which shows a vertical section through the device.

A is a smelting-furnace connected by an arched flume B with the condensing-chamber C.

D is a division-wall extending from the arched top of the flume B down across the condensing-chamber C to within a short distance from the bottom thereof. Through this division-wall D extends an inclined cylinder E, and to the interior surface of that cylinder is attached by air-tight joints an Archimedean screw E' of varying pitch, the pitch growing less as it approaches the exit end, so that the water-level will be the same throughout the length of the cylinder, which is fastened to and revolves with the spindle F, which may be revolved by a band or belt traveling over a pulley K, or by any other means desired.

G are pipes by which water may be conveyed into the dome of the condensing-chamber and there discharged in small jets or sprays, the outer ends of the pipes being provided with perforated ends for that purpose, thus aiding in the condensation of the fumes. The bottom of the condensing-chamber contains water L up to the level indicated in the drawing.

H is an aperture through the wall to carry off the surplus water.

I is a smoke-stack to convey such smoke and gas as is designed to be discharged as refuse matter.

The operation is essentially as follows: The fumes from the smelting-furnace A pass into one portion of the chamber C, and by means of the conveyer are drawn along the water L into the other compartment of chamber C, being cooled in their passage and the solid matter precipitated, the refuse passing off through the stack. As may be seen from the drawing, the area of the conveyer above the water-level gradually decreases from the inlet to the exit, and so does the pitch, so that when the gas enters at the inlet end at a high temperature it substantially fills the space provided for it, and as it gradually decreases in temperature from one end to the other of the conveyer it loses its expansive power, filling the decreased space provided for it. By this arrangement the water-level is always kept constant and the effectiveness of the apparatus gradually increased.

I do not intend to limit myself to any specific construction of conveyer, the essential principle of my invention being to diminish the capacity of the gas portion of the conveyer from the inlet to the exit, so as to keep the water-level the same on both sides of the division-wall.

Having now fully described my invention, what I claim, and desire to protect by Letters Patent, is—

1. In an apparatus for condensing fumes, a conveyer with a spiral passage partially submerged in water, the walls of said passage converging from its inlet to its exit.

2. In an apparatus for condensing fumes, a conveyer with a spiral passage partially submerged in water, the conveyer being of decreasing area above the water-line and the walls of said passage converging from its inlet to its exit.

In testimony of which invention I have hereunto set my hand.

HANNIBAL W. RAPPLEYE.

Witnesses:
FRANK S. BUSSER,
MINNIE F. ELLIS.